United States Patent Office 3,585,158
Patented June 15, 1971

3,585,158
PROCESS FOR THE PRODUCTION OF FOAM RUBBER
Pieter Luijk, Pieter H. M. Höller, and Jacobus M. Rellage, Delft, Netherlands, assignors to Shell Oil Company, New York, N.Y.
No Drawing. Continuation of application Ser. No. 559,705, June 23, 1966. This application July 14, 1969, Ser. No. 847,495
Claims priority, application Netherlands, July 1, 1965, 6508504
Int. Cl. C08f 47/10; C08j 1/26
U.S. Cl. 260—2.5
6 Claims

ABSTRACT OF THE DISCLOSURE

This invention relates to the extrusion of a composition containing rubber, vulcanizing components and a vaporizable substantially inert organic liquid, the improvement comprising attaining maximum expansion of the cellular structure substantially at the end of the scorch period.

---

This application is a continuation of U.S. application Ser. No. 559,705, filed June 23, 1966, now abandoned.

This invention relates to a process for the manufacture of foam rubber, particularly, but not exclusively, for the manufacture of foam rubber in an extrusion process.

Foam rubber may be manufactured from a rubber composition containing a blowing agent which is decomposed by heating during which a gas is formed which imparts a foam structure to the rubber. After it has been foamed up the rubber may be vulcanized, for example, by further heating of the rubber composition which has previously been provided with a vulcanizing agent. These blowing agents which form gases by decomposition, such as, for example, organic nitrogen compounds, are relatively expensive compared with liquid blowing agents which form gases by means of evaporation. Moreover, these socalled "chemical blowing agents" give the final product an offensive odor. It has been found, however, that with the aid of the "physical liquid blowing agents" it is difficult to form a foam rubber having cells of uniform size, while it has similarly appeared to be impossible to retain an initially advantageous cellular structure in the rubber composition by vulcanization of the foam rubber. Moreover, considerable losses often occur when liquid blowing agents are used wing to evaporation of the blowing agent.

The object of the invention is to provide a process for the manufacture of foam rubber in which by the use of a liquid blowing agent the said drawbacks are avoided and a vulcanized product having an advantageous cellular structure can be obtained.

The proces of the invention is characterized in that a composition containing a liquid organic blowing agent and a vulcanizing agent is foamed up with complete evaporation of the blowing agent and is vulcanized, the greatest degree of foaming up of the rubber composition being reached at the beginning of the vulcanization reaction, i.e., at the end of the scorch time.

When a rubber composition containing a vulcanizing agent is brought up to a temperature required for the vulcanization, some time elapses before the vulcanization reaction sets in, during which time the viscosity decreases and then remains substantially unaltered and this period of time is known as the initiation time of the vulcanization process. After this initiation time the vulcanization reaction proper begins, which is apparent from a considerable rise in the viscosity of the rubber mass. It is during the initial period of this vulcanization reaction proper that according to the invention the greatest degree of foaming up of the rubber should be reached.

Preferably the greatest degree of foaming up is reached at a moment very close to that at which the scorch time of the rubber composition has elapsed. The term "scorch time" indicates the so-called "Mooney scorch time" defined according to ASTM test D 1646–61. This scorch time depends on the structure of the rubber composition, so that by means of the choice of the ingredients of the rubber composition, especially the choice of the vulcanizing recipe a certain desired scorch time may be obtained. The scorch time also depends on the temperature; if, for example, the scorch time of a certain rubber composition is 20 minutes at 125° C., it is only approximately 5 minutes at 145° C.

For the purpose of describing the present invention, a suitable scorch time approximating the arbitrary 5 Mooney unit viscosity rise above minimum viscosity will be taken to be a range of 2–8 Mooney Units. Where, in the specification and claims reference is made to Mooney units, these are units according to the ASTM test, expressed as ML–4 units at 212° F. Also, where reference is made to cure of the subject cellular structures, this is to be understood to refer to a Mooney viscosity increase of at least 25 units (preferably 30 units) above the scorch time viscosity. The cure curve given in the official description of the ASTM test will aid in interpreting these aspects.

The invention also provides a method in which the above process for the preparation of foam rubber is carried out together with an extrusion process in which the foam rubber is manufactured in the form of, for example, bars, plates or strips or of more or less complicated profiles, as in weather-stripping profiles.

According to this method the foaming takes place during the extrusion of the rubber composition from an extruder, the amount of initially liquid blowing agent in the rubber composition being les than 25% of the weight of the raw rubber, the extrudate temperature being maintained at at least 15° C. above the boiling point at atmospheric presure of the blowing agent and the pressure at the beginning of the extrusion die being at least equal to the vapor presure of the blowing agent at the temperature prevailing in situ. The term "raw rubber" as used in the specification and claims should be understood to mean the rubber including any extending oil present therein, but including blowing agent, vulcanizing agents and any fillers present. The beginning of the extrusion die is situated at the point where the extrusion die head is secured to the extrusion cylinder. This point is generally where the extrusion screw ends.

Foaming and the vulcanization of the rubber may both be effected in an oven by means of heat supply to the rubber mass. If the foam rubber is formed by extrusion, it may be vulcanized immediately after leaving the extrusion die, the extrudate temperature being maintained or increased.

In order to met the requirement that the maximum degree of foaming up and the end of the scorch time reaction should occur substantially simultaneously, the vulcanizing agent should be chosen in such a way that at the residence time of the rubber composition in the extruder and the temperatures prevailing therein, the initiation time will have elapsed completely or almost completely by the time the rubber mass leaves the extrusion die.

Another possibility is to extrude the rubber composition containing the vulcanizing agents, to which composition the blowing agent has been added at a temperature below that of the boiling point of the blowing agent, so that the rubber mass is only given a certain form or profile. The product obtained may subsequently be foamed up and vulcanized in an oven, during which operation care should be taken that the desired maximum extent of foaming is obtained substantially when scorch time of the rubber composition elapses.

The process according to the invention is suitable for many kinds of vulcanizable rubber or rubber mixtures, such as, for example, butadiene rubber, styrene-butadiene rubber (SBR) and isoprene rubber. Suitable blowing agents are organic compounds having a sufficiently low boiling point, for example, hydrocarbons, alcohols, ketones, esters, halogen-substituted hydrocarbons, etc., provided that they do not have any detrimental effect on the properties of the final product. Water is not suitable as a blowing agent since it cannot be mixed homogeneously in a solid rubber composition, and thus the invention does not relate to blowing of latex rubber. Conventional fillers, such as carbon black, clay and other compounds containing silica may be applied. These fillers cannot be used in the manufacture of foam rubber from latex or can only be used to a very minor extent. Below are given some examples of tests carried out. Unless otherwise stated, use was made in the extrusion tests of an extruder in which the liquid blowing agent was supplied to the rubber mass during extrusion at an injection point in the extruder. This extruder was of the worm screw type and had the following principal dimensions:

|  | Mm. |
|---|---|
| Length of extrusion cylinder | 1285 |
| Diameter of extrusion cylinder | 60 |
| Diameter of extrusion die | 10 |
| Length of cylindrical part of the extrusion die | 50 | liquid injection joint at a distance of 605 mm. from the feed inlet.

Vulcanizing recipes are well known in the art and are usually developed to suit a specific set of process conditions, equipment and product. Typical components include the following:

Vulcanizing agents:
 Sulfur
 Tetramethyl thiuram disulfide
 Selenium diethyl dithiocarbamate
 Dipentamethylene thiuram tetrasulfide Accelerators:
 Benzothiazyl disulfide
 N-oxydiethylene benzothiazole-2-sulfenamide
 2-Mercaptobenzothiazole
 Zinc dibutyl dithiocarbamate Activators:
 Zinc oxide
 Fatty acids The parts of blowing agent and other additives given in the examples are based on 100 parts by weight of the raw rubber.

EXAMPLE I

As starting material a rubber composition was used having the following formulation:

|  | Parts |
|---|---|
| S.B.R. 65 ML-4 viscosity at 212° F., 24.5% bound styrene | 5 |
| Zinc oxide | 5 |
| Stearic acid | 4 |
| Antioxidant | 1 |
| Polyethylene glycol | 2.5 |
| Aluminum silicate | 60 |
| Rubber extending oil | 5 |
| Sulfur | 2.5 |
| N-oxydiethylene-2-benzothiazole sulfenamide | 1.25 |
| N'N'-diphenylguanidine | 0.95 |

The scorch time of this composition at 125° C. was 20 minutes. Two parts of isopentane was used as blowing agent.

The above mixture, with the exception of the blowing agent, was fed to the screw extruder in the form of cold strips; the blowing agent was added during the extrusion through the injection point of the extruder.

The temperature of the extrusion cylinder was set at 75° C. and that of the extrusion die at 50° C.

The average residence time of the mass in the extruder was approximately from 6 to 8 minutes. As it left the extruder, the extrudate, which had a temperature of 140° C. began to foam up, and by the time it had reached a short distance from the extruder die the extrudate was completely foamed. The scorch time was so chosen that the initiation period of the rubber composition had elapsed and the vulcanization reaction had begun in the extrudate very shortly after the latter had left the extruder, i.e., at the moment that the extrudate reached the greatest degree of foaming. This vulcanization reaction took place while the foamed extrudate was passed through a dielectric oven having a frequency of 35–38 millicycles per second (0.5 kw.) over a period of 10 seconds immediately after the complete foaming up, and subsequently through a thermal oven over a period of 3 minutes (temperature 190° C.) The result was a vulcanized foam rubber product having a specific gravity of 0.26 g./cm.$^3$, a cell diameter of 1.0 to 1.5 mm., and a uniform surface. In the present experiment the use of a vulcanization system leading to a scorch time shorter than 20 minutes at 125° C. was considered unacceptable on account of the risk that slight variations in the production conditions would cause the vulcanization reaction to set in at a moment when the extrudate was still within the die of the extruder, a circumstance which would lead to jamming up of the extrusion screw in the extrusion cylinder. In order to obviate this risk it is desirable that the vulcanization reaction only begins some time, albeit short, after the rubber composition has left the extrusion die. This requirement can easily be met in view of the fact that the greatest degree of foaming up in the extrudate usually also takes place only at a short distance from the extrusion die. However, it was found that the quality of the foam rubber deteriorated rapidly when a vulcanization system was used leading to a scorch time of longer than 25 minutes at 125° C.

EXAMPLE II

Tests were carried out with the following compositions:

|  | Parts |
|---|---|
| Polybutadiene. |  |
| Zinc oxide | 5 |
| Stearic acid | 4 |
| Antioxidant | 1 |
| Polyethylene glycol | 2.5 |
| Aluminum silicate | 60 |
| Rubber extending oil | 10 |

Since the tests were aimed at examining the structure of the foam rubber no vulcanization system was added.

The pressure drop over the extrusion die was approximately 60 atm. gauge, and the extrudate temperature was 115° C. Under these conditions various quantities of n-heptane were injected into the extruder as blowing agent (boiling point at atmosphere pressure 96° C.).

The quality of the extruded foam, depending on the percentage of blowing agent, is summarized in the following table.

TABLE I

| Percentage of blowing agent | Cell size (mm.) | Specific gravity (g./cm.$^3$) | Appearance of the surface |
|---|---|---|---|
| 10 | 1–2 | 0.44 | Very slight irregularities. |
| 14 | 1.5–2 | 0.58 | Do. |
| 19 | 1–3 | 0.48 | Do. |
| 23 | 2.5–4 | 0.39 | Greater irregularities. |
| 26 | 4–6 | 0.34 | Great irregularities. |
| 29 | 4–6.5 | 0.32 | Do. |

EXAMPLE III

Tests were carried out with the following rubber composition, using n-hexane as blowing agent:

| | Parts |
|---|---|
| Polyisoprene | |
| Zinc oxide | 5 |
| Stearic acid | 4 |
| Antioxidant | 1 |
| Polyethylene glycol | 2.5 |
| Aluminum silicate | 60 |

In order to examine the influence of the extrudate temperature on the degree of foaming up, as evidenced by the specific gravity, the extrusion was carried out at different temperatures.

The results are summarized in the following table.

TABLE II

| Percentage of blowing agent | Extrudate temp., °C. | Specific gravity of extrudate (g./cm.³) |
|---|---|---|
| 3 | 80 | 1.0 |
| 19 | 95 | 0.48 |
| 4.5 | 130 | 0.40 |

The extrudate having a specific gravity of 1.0 g./cm.³ was unfoamed or virtually unfoamed and thus unacceptable. The extrudates having specific gravities of 0.48 g./cm.³ and 0.40 g./cm.³ were of good quality.

EXAMPLE IV

The mixture as given in Example I was extruded at various extrudate temperatures. The blowing agents used are given, together with the results obtained, in the table below.

TABLE III

| Blowing agent | Boiling point of the blowing agent at atmospheric pressure, °C. | Percentage of blowing agent, percent by weight | Extrudate temp., °C. | Specific gravity of extrudate, g./cm.³ | Cell size of extrudate, mm. | Pressure at the end of the extrusion screw, atm. gauge |
|---|---|---|---|---|---|---|
| Methanol | 65 | 0.8 | 155 | 0.31 | 0.1–0.7 | 140 |
| Ethanol | 78 | 2.7 | 125 | 0.32 | 0.2–0.7 | 140 |
| Butane | 1 | 2.2 | 120 | 0.29 | 0.5–1 | 160 |
| Isooctane | 101 | 6.7 | 150 | 0.34 | 2–3.5 | 40 |
| Acetone | 57 | 3.7 | 140 | 0.26 | 0.7–1.3 | 70 |
| Methyl acetate | 58 | 3.4 | 130 | 0.25 | 0.5–1.2 | 110 |
| Cyclohexane | 81 | 3.9 | 150 | 0.29 | 0.1–0.9 | 160 |
| Trichlorofluoromethane | 24 | 4.8 | 130 | 0.28 | 0.3–1 | 160 |

EXAMPLE V

The influence of the pressure drop over the extrusion die was examined by varying the diameter and the length of the cylindrical part of the extrusion orifice.

For this experiment use was made of the following rubber composition:

| | Parts |
|---|---|
| S.B.R. | |
| Zinc oxide | 5 |
| Stearic acid | 4 |
| Antioxidant | 1 |
| Polyethylene glycol | 2.5 |
| Aluminum silicate | 60 |
| Rubber extending oil | 5 |

1.5% of isopentane (boiling point at atmospheric pressure 28° C.) was used as blowing agent. In all cases the extrudate temperature was 155° C., at which temperature the vapor pressure of the blowing agent was 19.5 atm. abs.

The results obtained are summarized in the following table:

TABLE IV

| | Cell size of extrudate (mm.) | Specific gravity of extrudate (g., cm.³) |
|---|---|---|
| Pressure of the beginning of the cylindrical part of the extrusion die (atm. gauge): | | |
| 15 | 8–10 | 0.50 |
| 18 | 5–7 | 0.28 |
| 24 | 1–1.5 | 0.25 |
| 30 | 1–1.5 | 0.29 |
| 100 | 0.2–0.5 | 0.31 |

The first two extrudates had very large cells, while the first extrudate was also insufficiently foamed up. The last three extrudates were foamed up with small, regularly distributed cells. The best quality of foam rubber (small cells, at low specific gravity) was obtained at very great pressure drops over the extrusion die.

When the pressure drop over the extrusion die was reduced to below the vapor pressure of the boiling agent at the prevailing temperature, an irregular and insufficiently foamed product was obtained, and in some cases no foaming took place at all.

EXAMPLE VI

In a continuous test lasting twelve hours, use was made of the rubber composition described in Example I. The blowing agent, isopentane, was fed into the cylinder of the extruder through the injection point. The measured maximum fluctuations in the observations during the test are given in the following table:

TABLE V

| | |
|---|---|
| Extrudate temperature, °C. | 145±5 |
| Blowing agent concentration, percent by wt. | 1.8±0.1 |
| Pressure at entry into extrusion die, atm. gauge | 95±5 |
| Specific gravity of the extrudate, g./cm.³ | 0.27±0.02 |
| Cell size, mm. | 0.1—0.5 |
| Surface | Smooth |

The quality of the foam remained substantailly constant, and the cellular structure of the product remained very regular.

EXAMPLE VII

N-hexane (boiling point 68° C.) was mixed on a roll mill into the rubber composition given in Example I, to which no vulcanization agents had been added. Although both mill rolls were cooled, it proved to be impossible to admix this liquid in large quantities under normal conditions. The miscibility at atmospheric pressure was such that the blowing agent evaporated to a large extent while still being admixed. The maximum amount of n-hexane which can be admixed in this manner is approximately 5% by weight.

The rubber composition containing 5% by weight of n-hexane was fed, in the form of cold strips, into an extruder having the following principal dimensions:

| | Mm. |
|---|---|
| Length of extrusion cylinder | 376 |
| Diameter of extrusion cylinder | 80 |
| Diameter of extrusion die | 8 |
| Length of the cylindrical part of the extrusion die | 59 |

The extrudate having a discharge temperature of 100° C. had a uniform surface. The extrudate had a specific gravity of 0.95 g./cm.³, and was unfoamed or virtually unfoamed. It proved possible to admix much greater amounts of the blowing agent by not admixing it previously, but by injecting it into the said liquid injection extruder. In particular for blowing agents having a low boiling point the necessary large quantities of blowing agents can only be mixed with the rubber composition by injection into the extruder.

EXAMPLE VIII

Extrusion, followed by foaming up and vulcanization at a later time.

The following formulation was used for this experiment:

| S.B.R. | Parts |
|---|---|
| Zinc oxide | 5 |
| Stearic acid | 4 |
| Antioxidant | 1 |
| Polyethylene glycol | 2.5 |
| Aluminum slicate | 60 |
| Rubber extending oil | 30 |
| Xylene | 10 |
| Sulfur | 3 |
| N-oxydiethylene-2-benzothiazole-sulfenamide | 1 |
| Mixture of 2-mercapto benzothiazole and a dithiocarbamate | 0.5 |

The xylene was added to the mixture on the roll mill under normal conditions at 50° C. The rubber composition was subsequently extruded in an extruder having the following principal dimensions:

| | Mm. |
|---|---|
| Length of extrusion cylinder | 448 |
| Diameter of extrusion cylinder | 38 |
| Diameter of extrusion die | 10 |
| Length of cylindrical part of the extrusion die | 62.5 |

The extrudate temperatures chosen were invariably below the boiling point of the xylene (139–144° C.). The resultant, unfoamed extrudate was subsequently directly foamed up by means of heating and vulcanized in:
(a) a thermal oven for 20 minutes at 165° C.,
(b) a combination of a dielectric oven, for 60 seconds at 0.75 kw. and a thermal oven, for 12 minutes at 165° C.

The results obtained with the extrudate were as follows:

TABLE VI

| Extrusion | Foaming up and vulcanization | | | |
|---|---|---|---|---|
| | Thermal oven | | Thermal plus dielectric oven | |
| Extrudate temperature, °C. | Specific gravity, g./cm.³ | Cell size mm. | Specific gravity, g./cm.³ | Cell size, mm. |
| 25 | 0.45 | 0.5-2 | | |
| 50 | 0.45 | 0.5-2 | 0.42 | 0.5-3 |
| 75 | 0.45 | 0.5-2.5 | | |
| 100 | 0.45 | 0.5-4 | | |

Owing to its high boiling point xylene can be readily admixed up to substantially any desired concentration. Rubber compositions containing xylene are readily extruded at discharge temperatures up to a maximum of 100° C. Above 100° C. separation occurs, and this is accompanied by the formation of irregularly distributed large cells having diameters in excess of 4 mm.

We claim as our invention:

1. In the preparation of a cellular rubber together with an extrusion process wherein a vulcanizable rubber composition consisting essentially of a raw rubber, vulcanizing components and a vaporizable substantially inert organic liquid is subjected to heating sufficient to initiate vulcanization, whereby initially the composition attains a minimum Mooney viscosity, thereafter then attains the end of the scorch period as indicated by an increase of 2–8 Mooney viscosity units higher than the minimum, and thereafter the composition is cured as indicated by an additional increase of at least about 25 Mooney viscosity units, the improvement comprising attaining maximum expansion of the cellular structure obtained substantially at the end of the scorch period by vaporizing said liquid by additional heat and release of pressure.

2. A process as claimed in claim 1 characterized in that the foaming takes place during the extrusion of the rubber composition from an extruder, the amount of liquid blowing agent being less than 25% by weight of the raw rubber, the extrudate temperature being maintained at at least 15° C. above the boiling point at atmospheric pressure of the blowing agent, and the pressure at the beginning of the extrusion die being at least equal to the vapor pressure of the blowing agent at the temperature prevailing in situ.

3. A process as claimed in claim 1 inclusive, characterized in that the blowing agent is injected into the rubber composition during the extrusion.

4. A process according to claim 1 wherein the scorch time is taken as the time of a 5 Mooney unit rise above the minimum viscosity.

5. A process according to claim 1 wherein the organic liquid is from the group consisting of alcohols, ketones, esters, aliphatic hydrocarbons, cycloaliphatic hydrocarbons and aromatic hydrocarbons.

6. A process according to claim 1 wherein the vulcanizable rubber composition contains conventional fillers from the group consisting of carbon blacks, clays, and other silica compounds.

References Cited

UNITED STATES PATENTS

| 1,427,754 | 8/1922 | Gibbons et al. | 264—53 |
| 2,039,191 | 4/1936 | Schidrowitz et al. | 264—53 |
| 2,806,255 | 9/1957 | Dietz | 260—2.5E |
| 2,870,489 | 1/1959 | Rockoff | 260—2.5E |
| 3,010,916 | 11/1961 | Pooley | 260—2.5E |
| 3,207,711 | 9/1965 | Spenadel et al. | 260—2.5E |
| 3,379,802 | 4/1968 | Raley et al. | 260—2.5E |

MURRAY TILLMAN, Primary Examiner

M. FOELAK, Assistant Examiner

U.S. Cl. X.R.

260—33.4, 41.5; 264—53